E. H. SMITH.
PERISCOPIC EYE PROTECTOR.
APPLICATION FILED JAN. 21, 1918.

1,318,812. Patented Oct. 14, 1919.

WITNESSES

INVENTOR
ELMER H. SMITH
BY
ATTORNEYS

UNITED STATES PATENT OFFICE.

ELMER H. SMITH, OF MINNEAPOLIS, MINNESOTA.

PERISCOPIC EYE-PROTECTOR.

1,318,812.  Specification of Letters Patent. Patented Oct. 14, 1919.

Application filed January 21, 1918. Serial No. 213,047.

*To all whom it may concern:*

Be it known that I, ELMER H. SMITH, a citizen of the United States, resident of Minneapolis, in the county of Hennepin and State of Minnesota, have invented certain new and useful Improvements in Periscopic Eye-Protectors, of which the following is a specification.

In using an oxy-acetylene torch for welding purposes it is necessary for the workman to have some protection for the eyes to prevent serious injury thereto while handling the intense flame of the torch used in welding, cutting, grinding and clipping. Generally goggles with colored lens of various kinds have been provided to soften the intense rays of the flame, but these have been more or less objectionable because the flame and the metal being welded take on a color corresponding to that of the lens instead of assuming the natural color most desirable for the holder of the torch.

The object of my invention, therefore, is to provide a means for protecting the eyes of the workman from injury, and at the same time presenting to his field of vision a reflection of the welding flame and the metal in their true or natural color.

The invention consists generally in the various constructions and combinations hereinafter referred to and particularly pointed out in the claims.

In the accompanying drawings forming part of this specification,

Figure 2:
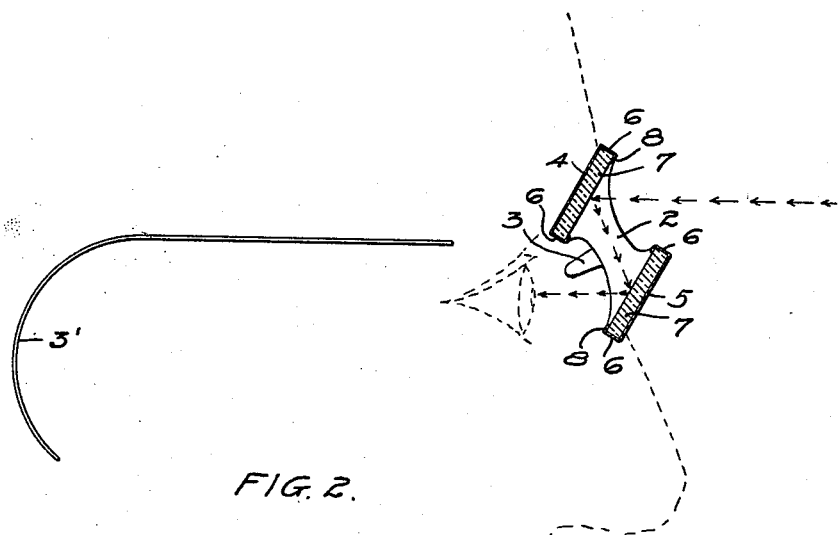
Fig. 2 is a vertical sectional view on the line 2—2 of Fig. 1.
Figure 1:
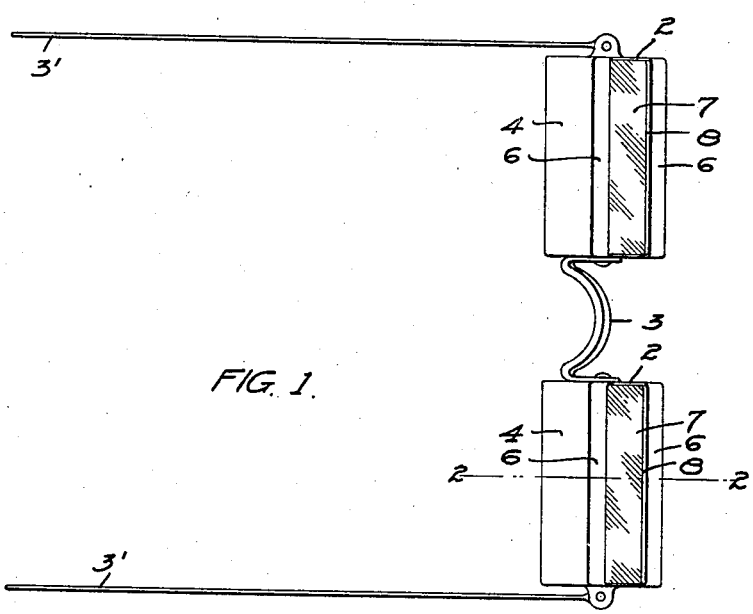
Figure 1 is a plan view of an eye protecting device embodying my invention.

The device is made in the form of a pair of spectacles comprising frames 2 connected by a suitable bridge 3, and having the actual bows 3' for holding the device in place on the head. Each of the frames 2 has an upper and a lower plate 4 and 5 arranged in parallel relation at an angle of about 30 degrees to the vertical and spaced apart a suitable distance above and below the bridge 3. Each plate is provided with longitudinal flanges 6 between which small plates of glass 7 are inserted and held in place by suitable means such as lips 8 formed on the flanges 6. These plates of glass are polished on one side and have a ground surface on the other side, so that they will be translucent but not transparent, and when they are mounted in the supporting frames the lower edge of the upper plate will be on a level substantially with the upper edge of the lower plate. The upper plates will be exposed to the rays of light from the welding flame and a reproduction of the flame will be reflected or transferred from the surface of the upper plates to those of the lower plates. As indicated in Fig. 2 the lower plates will be directly in the line of vision of the workman and prevent the light of the welding flame from reaching his eyes while at the same time the flame will be plainly visible in the surface of the lower plate, and this reproduction will be the same color as the flame itself. These plates may be made in various sizes and shapes and their relative position in the frames may be varied and still be within the scope of my invention.

I claim as my invention:

1. A device of the class described, comprising frames having means for mounting them on the head, plates having reflecting surfaces mounted in said frames in parallel relation one above the other and at an angle to the vertical and the line of vision, one pair of plates being exposed to the object to be reflected and the other pair of plates being mounted in the line of vision at an angle to receive the reflection of the object from the first pair of plates.

2. A device of the class described comprising a spectacle frame having means for mounting it on the head, reflectors mounted in said frame, one of said reflectors being positioned in the line of vision between the eye and the object to be reflected and outwardly and upwardly inclined, the other reflector being exposed to the object to be reflected and mounted to reflect the image thereof upon the first reflector where it may be seen by the eye of the wearer of the instrument.

3. A device of the class described comprising a frame having means for mounting it on the head and reflector plates mounted in pairs in said frame, one pair of plates being interposed between the eye of the wearer and the object and the other pair of plates being mounted to reflect the image of the object upon the first pair of plates, said first pair of plates serving as guards or deflectors to protect the eyes of the wearer.

4. An eye protecting device for viewing objects in the direct line of vision comprising a frame having means for mounting it on the head, reflectors mounted in said frame in the direct line of vision and non-transparent serving as guards for the eyes of the wearer, and reflectors exposed to the object for reflecting the image thereof upon said first named reflectors.

In witness whereof, I have hereunto set my hand this 4th day of January, 1918.

ELMER H. SMITH.

Copies of this patent may be obtained for five cents each, by addressing the "Commissioner of Patents, Washington, D. C."